United States Patent
Arnott et al.

(10) Patent No.: US 11,051,484 B2
(45) Date of Patent: Jul. 6, 2021

(54) SPRAYER WITH ARTICULATED ARM AND SENSOR SYSTEM

(71) Applicant: FARM IMPROVEMENTS LIMITED, Christchurch (NZ)

(72) Inventors: Gary Arnott, Christchurch (NZ); Grant Chemaly, Christchurch (NZ)

(73) Assignee: FARM IMPROVEMENTS LIMITED, Christchurch (NZ)

( * ) Notice: Subject to any disclaimer, the term of this patent is extended or adjusted under 35 U.S.C. 154(b) by 0 days.

(21) Appl. No.: 17/036,946

(22) Filed: Sep. 29, 2020

(65) Prior Publication Data

US 2021/0100214 A1     Apr. 8, 2021

(30) Foreign Application Priority Data

Oct. 2, 2019 (NZ) ........................................ 757773

(51) Int. Cl.
*A01J 7/04*        (2006.01)
*B05B 15/656*      (2018.01)
(Continued)

(52) U.S. Cl.
CPC ................... *A01J 7/04* (2013.01); *A01K 1/12* (2013.01); *A01K 13/001* (2013.01);
(Continued)

(58) Field of Classification Search
CPC .......... A01J 7/04; A01K 13/001; A01K 1/12; B05B 15/656; B05B 15/68; B05B 15/652
(Continued)

(56) References Cited

U.S. PATENT DOCUMENTS 5,347,135 A   9/1994   Harris et al.
5,678,506 A   10/1997  Van Der Berg et al.
(Continued)

FOREIGN PATENT DOCUMENTS

CA      2775177 A1      7/2012
DE   202016106333 U1    11/2016
(Continued)

OTHER PUBLICATIONS

Notification of Transmittal of the International Search Report and the Written Opinion of the International Searching Authority, or the Declaration. dated Jan. 25, 2021. From Australian Patent Office. Searched for PCT/NZ2020/050111.
(Continued)

*Primary Examiner* — Yvonne R Abbott-Lewis
(74) *Attorney, Agent, or Firm* — Holzer Patel Drennan

(57) ABSTRACT

A teat sprayer for use in dairy applications is described that uses an articulated arm and system to deliver a spray to a teat and move between multiple dairy animals.

In one aspect the dairy animal teat treatment apparatus, comprises a spray inlet, a spray nozzle, a flow path extending between the spray inlet and the spray nozzle, and an articulated arm conveying the spray nozzle, movement of the articulated arm driven by an actuator. Articulated arm movement may be between a retracted position in which the spray nozzle and articulated arm are retracted and an extended position in which at least part of the articulated arm and spray nozzle thereon is extended, moving the spray nozzle to a position configured to be about an animal's udder.

In a further aspect, the apparatus, comprises an animal sensor positioned generally above and behind an animal bail and directed generally downwards configured to sense the presence of an animal in the animal bail; and a controller (Continued)

configured to actuate spraying of the animal's teats from spray nozzle extension and retraction in response to a signal received from the sensor.

The apparatus may act to reduce cost through reduced numbers of treatment apparatus and/or lower labour costs and expenses; increase accuracy/efficiency through automation and speed of treatment; address issues associated with the inconvenience/space constraints in dairy platform configurations; and minimise the number of sensors required and position these sensors away from the animal bail.

20 Claims, 16 Drawing Sheets

(51) Int. Cl.
    *B05B 15/652*    (2018.01)
    *B05B 15/68*    (2018.01)
    *A01K 13/00*    (2006.01)
    *A01K 1/12*    (2006.01)

(52) U.S. Cl.
    CPC .......... *B05B 15/652* (2018.02); *B05B 15/656* (2018.02); *B05B 15/68* (2018.02)

(58) Field of Classification Search
    USPC ........................................................ 119/670
    See application file for complete search history.

(56) References Cited

U.S. PATENT DOCUMENTS

| | | | |
|---|---|---|---|
| 5,784,994 A | 7/1998 | Van Der Lely | |
| 5,862,776 A | 1/1999 | Van Der Berg | |
| 6,055,930 A * | 5/2000 | Stein .................... | A01J 5/0175 119/14.08 |
| 6,279,507 B1 | 8/2001 | Van Der Lely et al. | |
| 6,443,094 B1 * | 9/2002 | DeWaard .................. | A01J 7/04 119/14.18 |
| 8,393,296 B2 * | 3/2013 | Hofman .................... | A01J 7/04 119/14.08 |
| 8,807,087 B2 * | 8/2014 | Arnott .................... | B05B 15/72 119/670 |
| 9,554,552 B2 * | 1/2017 | Mellberg .................. | A01J 7/04 |
| 9,826,709 B2 * | 11/2017 | Holmstrom ............... | A01J 7/04 |
| 10,757,907 B1 * | 9/2020 | Devereaux ............. | B25J 9/1697 |
| 2003/0202872 A1 | 10/2003 | Mori et al. | |
| 2004/0032974 A1 | 2/2004 | Kriesel | |
| 2005/0066903 A1 | 3/2005 | Van Den Berg et al. | |
| 2012/0200674 A1 | 8/2012 | Hofman et al. | |
| 2012/0260863 A1 | 10/2012 | Arnott et al. | |
| 2013/0247827 A1 | 9/2013 | Andersson et al. | |
| 2015/0250131 A1 | 9/2015 | Hofman et al. | |
| 2015/0366156 A1 | 12/2015 | Holmström et al. | |
| 2016/0066529 A1 | 3/2016 | Hofman et al. | |
| 2016/0309674 A1 | 10/2016 | Van Der Sluis | |
| 2017/0020100 A1 | 1/2017 | Hofman et al. | |
| 2018/0020632 A1 | 1/2018 | Krone et al. | |
| 2018/0049396 A1 | 2/2018 | Foresman et al. | |
| 2019/0230890 A1 | 8/2019 | Henry et al. | |

FOREIGN PATENT DOCUMENTS

| | | |
|---|---|---|
| EP | 0630567 A2 | 12/1994 |
| EP | 1537774 B1 | 5/2007 |
| GB | 1415318 A | 11/1975 |
| GB | 1523890 A | 9/1978 |
| NZ | 502723 A | 7/2000 |
| NZ | 570741 A | 9/2010 |
| NZ | 600762 A | 4/2014 |
| NZ | 708911 A | 11/2018 |
| NZ | 708932 A | 11/2018 |
| WO | 9946978 A1 | 9/1999 |
| WO | 0141560 A1 | 6/2001 |
| WO | 2010031632 A1 | 3/2010 |
| WO | 2012053903 A1 | 4/2012 |
| WO | 2014142728 A1 | 9/2014 |

OTHER PUBLICATIONS

Written Opinion of the International Searching Authority dated Jan. 25, 2021. New Zealand Patent Office. Searched for PCT/NZ2020/050111.

* cited by examiner

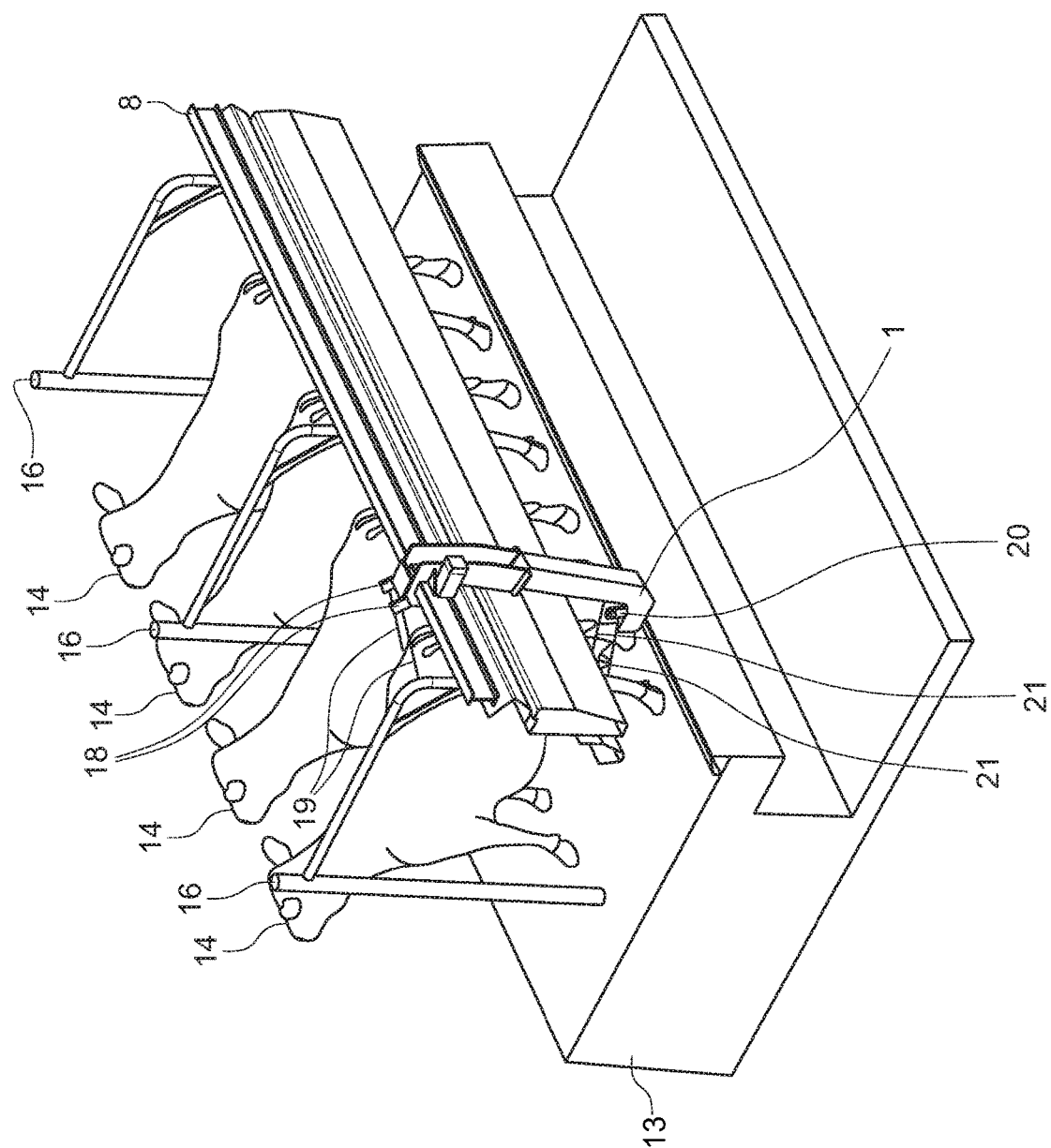

SPRAYER WITH ARTICULATED ARM AND SENSOR SYSTEM

RELATED APPLICATIONS

This application derives priority from New Zealand patent application number 757773 filed on 2 Oct. 2019, available via WIPO as DAS number EFDB.

TECHNICAL FIELD

Described herein is a sprayer with an articulated arm and sensor system. More specifically, a teat sprayer for use in dairy applications is described that uses an articulated arm and system to deliver a spray to a teat and move between multiple dairy animals.

BACKGROUND ART

Teat spraying in dairy sheds is a common method of preventing and/or treating teats/a mammary gland for infection. A typical problem in dairy animals is that of mastitis infection hence, considerable value may be gained in preventing mastitis infection from occurring. Spraying of disinfectant to teats is a common method to protect animals from mastitis infection.

Various robotic systems exist for positioning teat sprayers, one example being the applicants published patent application WO2011078702, marketed as the 'Teatwand™' product.

Art methods of teat treating can be costly in terms of capital equipment required and/or labour needed especially in larger operations. Further drawbacks of art apparatus are that they can be inefficient or inaccurate. As a result, teat sprays may not reach all teat surfaces or may use excessive amounts of spray to achieve desired coverage. They may also not be automated or only semi-automated and still require user input and time hence, are not ideal. A further drawback of existing teat spray systems is that they may be inconvenient in a cramped space. Large foot print systems may simply not fit or, take up excessive room. Finally, sensors are inherently sensitive to dirt, water and other materials in the environment about a milking platform or bail. Locating sensors well away from dirt, water or other materials and still achieving accuracy of operation can be a difficult design challenge particularly in busy and often cramped milking parlours.

Further aspects and advantages of the sprayer with an articulated arm and sensor system will become apparent from the ensuing description that is given by way of example only.

SUMMARY

Described herein is a teat sprayer for use in dairy applications that uses an articulated arm and system to deliver a spray to a teat and move between multiple dairy animals.

In a first aspect there is provided a dairy animal teat treatment apparatus, comprising:
- a spray inlet configured for connection to a source of teat treatment fluid;
- a spray nozzle to spray teat fluid therefrom;
- a flow path extending between the spray inlet and the spray nozzle;
- an articulated arm conveying the spray nozzle, movement of the articulated arm driven by an actuator, articulated arm movement being between:
  - a retracted position in which the spray nozzle and articulated arm are retracted; and
  - an extended position in which at least part of the articulated arm and spray nozzle thereon is extended, moving the spray nozzle to a position configured to be about an animal's udder, the spray nozzle configured to spray treatment fluid from the spray nozzle onto the animal's teats in or about the extended position.

In a second aspect, there is provided a dairy animal teat treatment apparatus, comprising:
- a spray inlet configured for connection to a source of teat treatment fluid;
- a spray nozzle to spray teat fluid therefrom;
- a flow path extending between the spray inlet and the spray nozzle;
- an animal milking platform comprising at least one animal bail;
- at least one optical animal sensor positioned generally above and behind an animal bail and directed generally downwards configured to sense the presence of an animal in the animal bail; and
- a controller configured to actuate spraying of the animal's teats from spray nozzle extension and retraction in response to a signal received from the optical animal sensor detecting the presence of an animal in the animal bail.

Advantages of the above apparatus may comprise one or more of the following:
- Lower cost through reduced numbers of treatment apparatus and/or lower labour costs and expenses;
- Greater accuracy/efficiency through automation and speed of treatment;
- Addressing issues associated with the inconvenience/space constraints in dairy platform configurations where large bulky foot print devices are either unable to be installed or which create an impediment to access;
- The apparatus described minimises the number of sensors required and also positions these sensors away from the animal bail. This may minimise problems with dirt, water or other materials affecting sensors and sensor performance, yet still achieve the desired accuracy.

BRIEF DESCRIPTION OF THE DRAWINGS

Further aspects of the sprayer with an articulated arm and sensor system will become apparent from the following description that is given by way of example only and with reference to the accompanying drawings in which:

FIG. 16 illustrates a rear perspective view of the system with the sprayer fully retracted in this case showing an alternate sensor arrangement.

DETAILED DESCRIPTION

Figure 1:
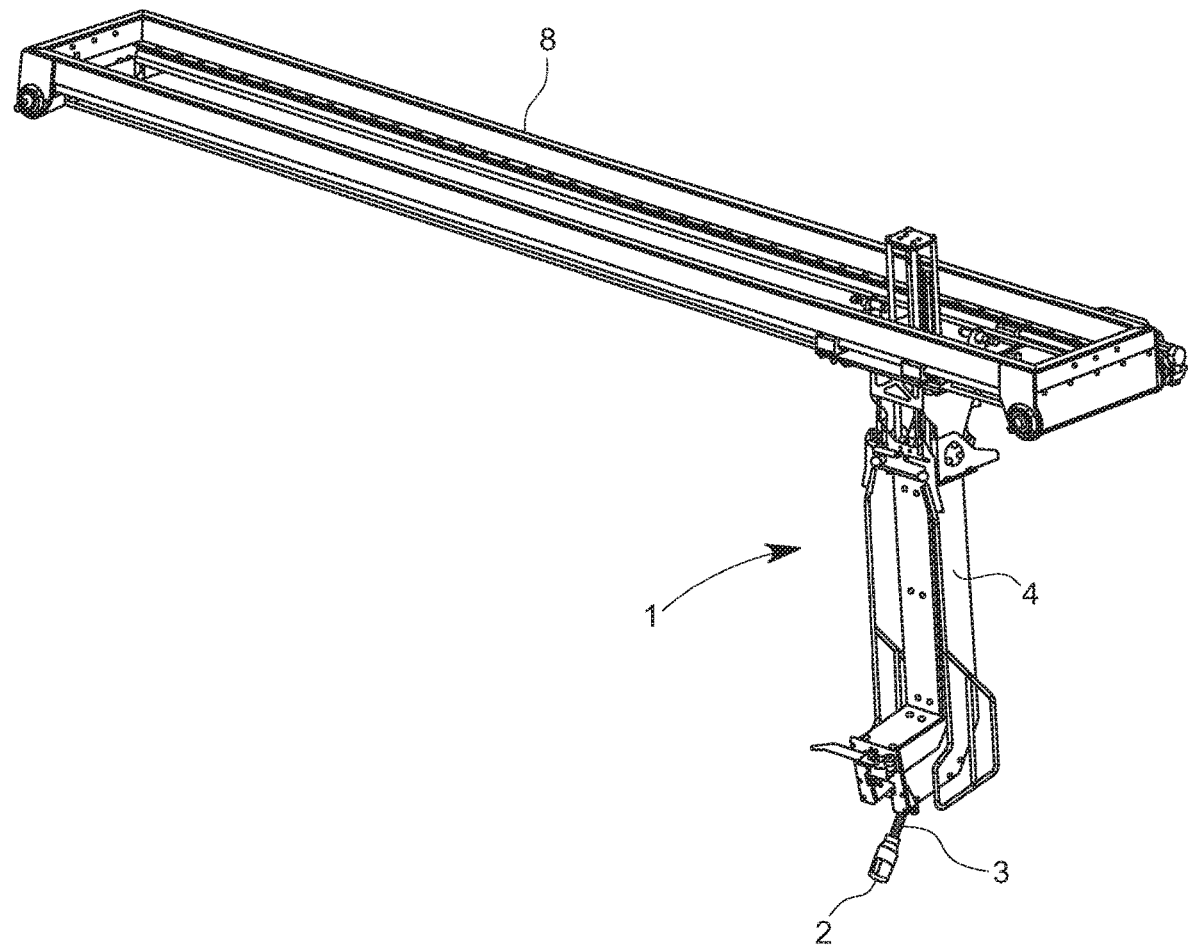
FIG. 1 illustrates a perspective view of a track and articulated arm thereon with the articulated sprayer in a retracted position.
Figure 2:
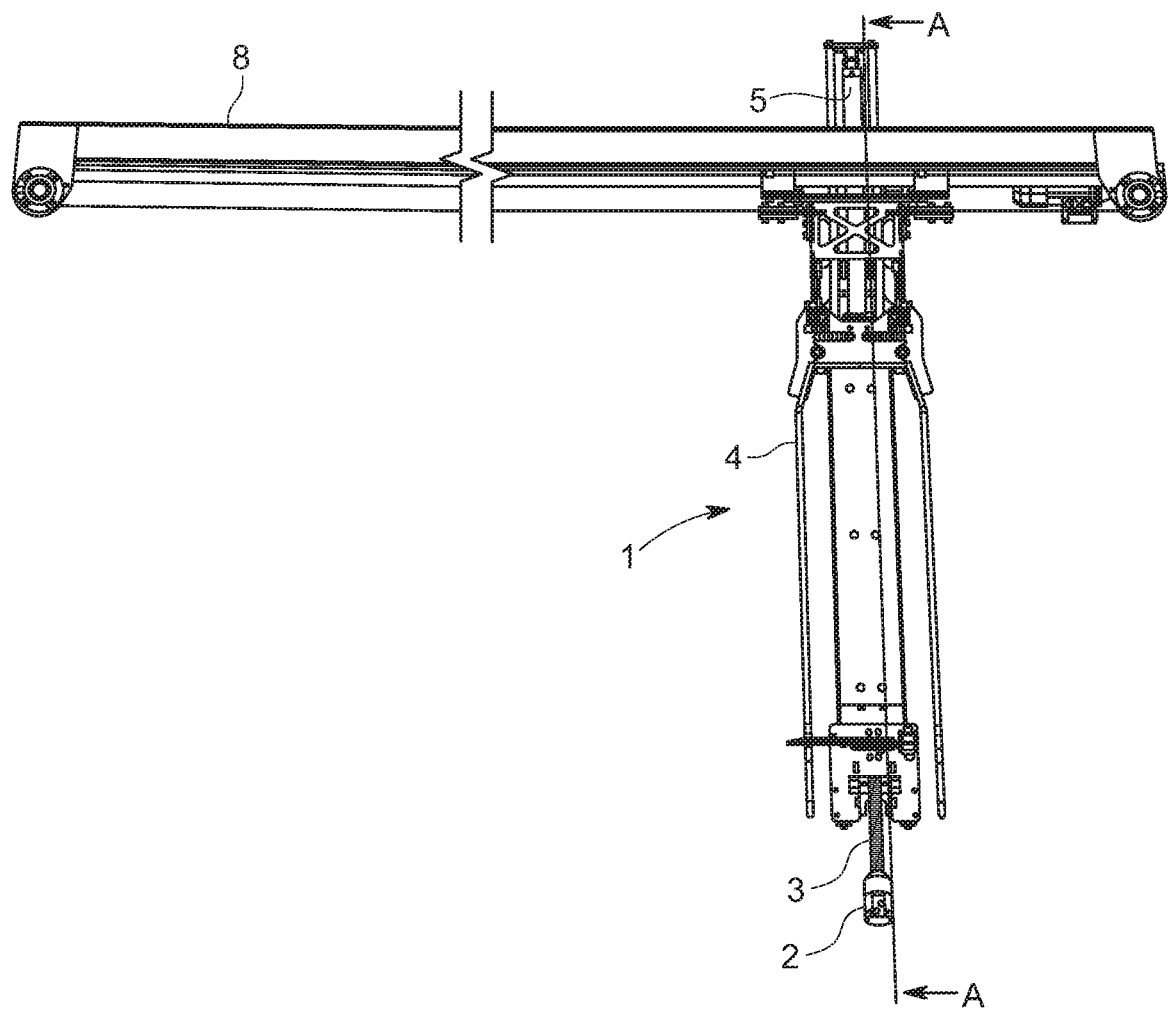
FIG. 2 illustrates a front elevation view of a track and articulated arm thereon with the articulated sprayer in a retracted position.
Figure 3:
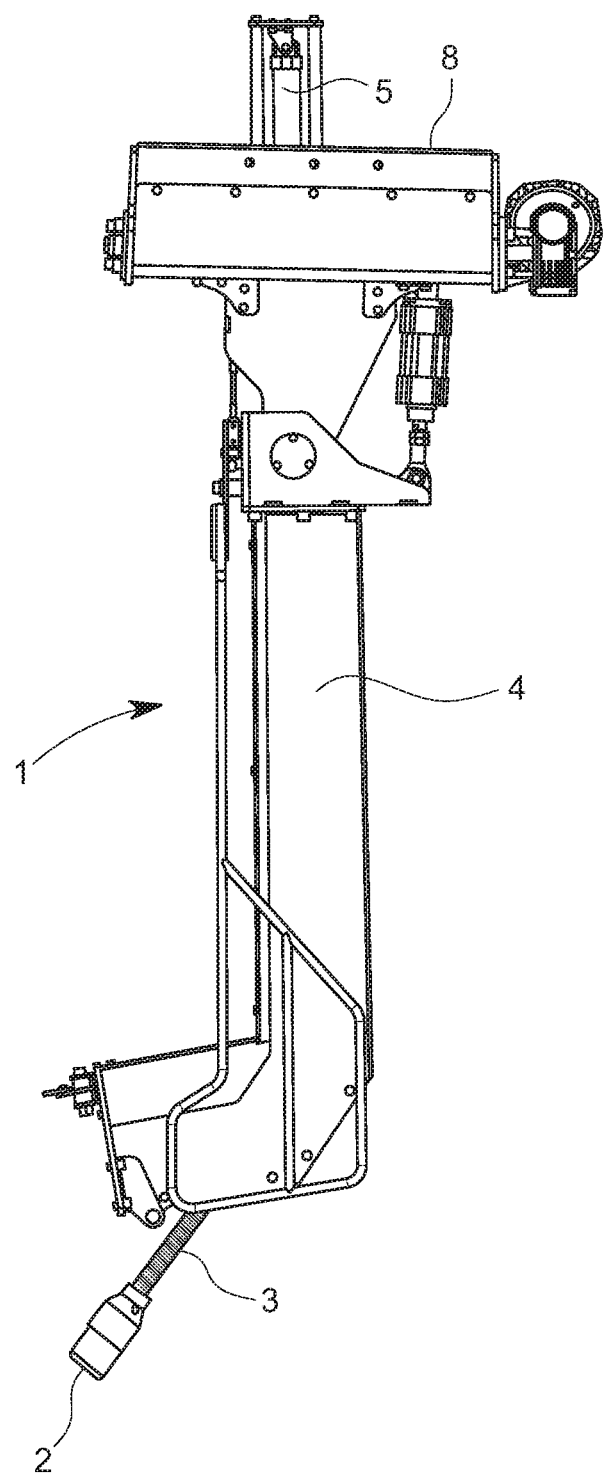
FIG. 3 illustrates a side elevation view of a track and articulated arm thereon with the articulated sprayer in a retracted position.
Figure 4:
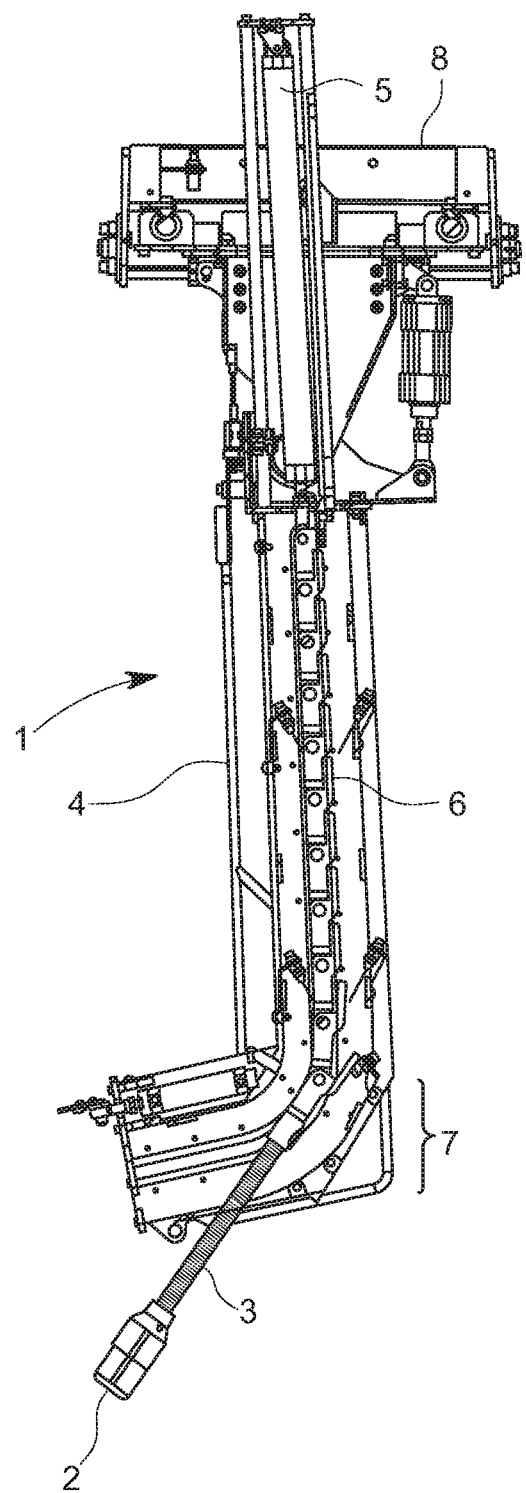
FIG. 4 illustrates a side cross-section elevation view about line A-A in FIG. 2 of a track and articulated arm thereon with the articulated sprayer in a retracted position.
Figure 5:
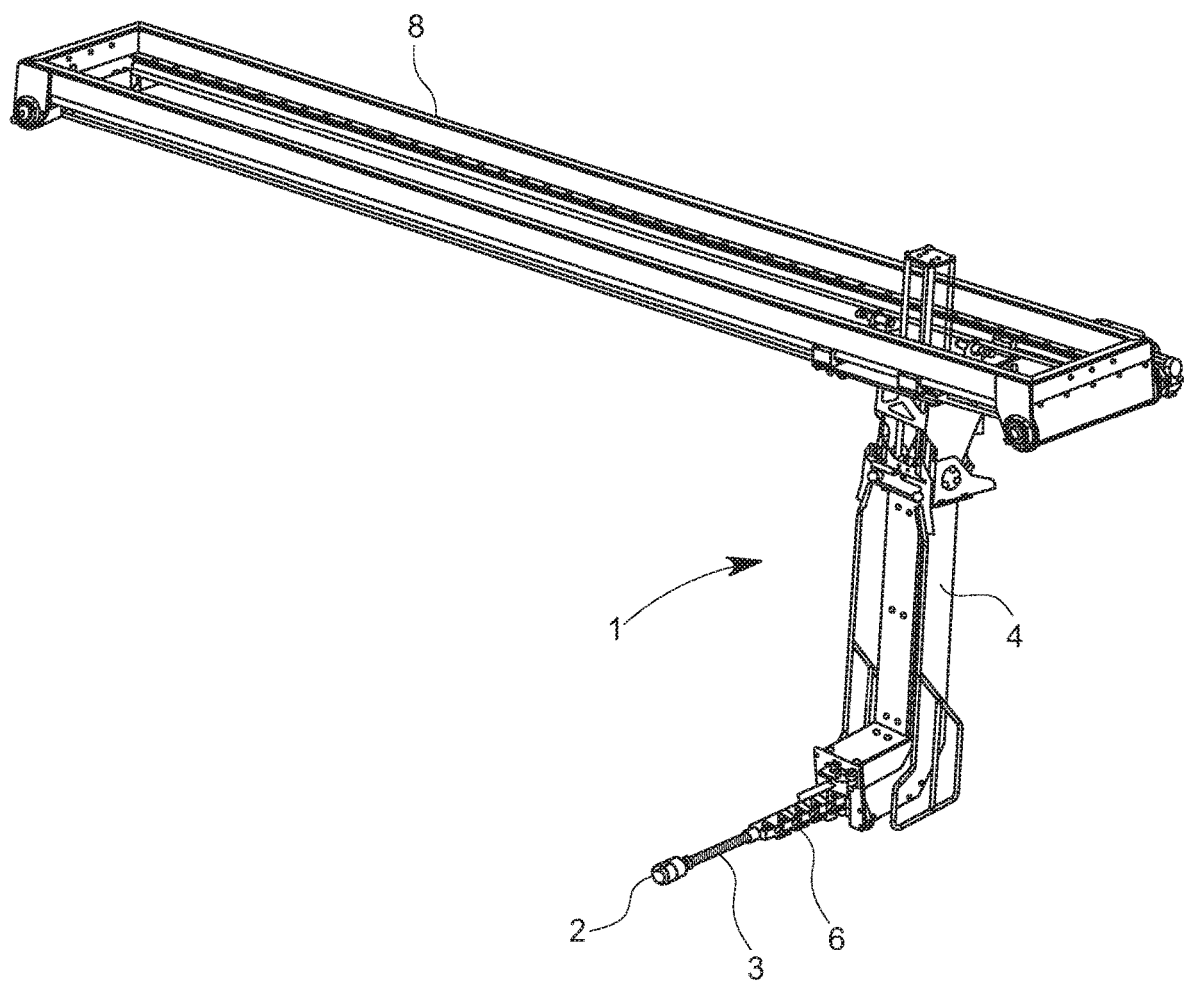
FIG. 5 illustrates a perspective view of a track and articulated arm thereon with the articulated sprayer in an extended position.
Figure 6:
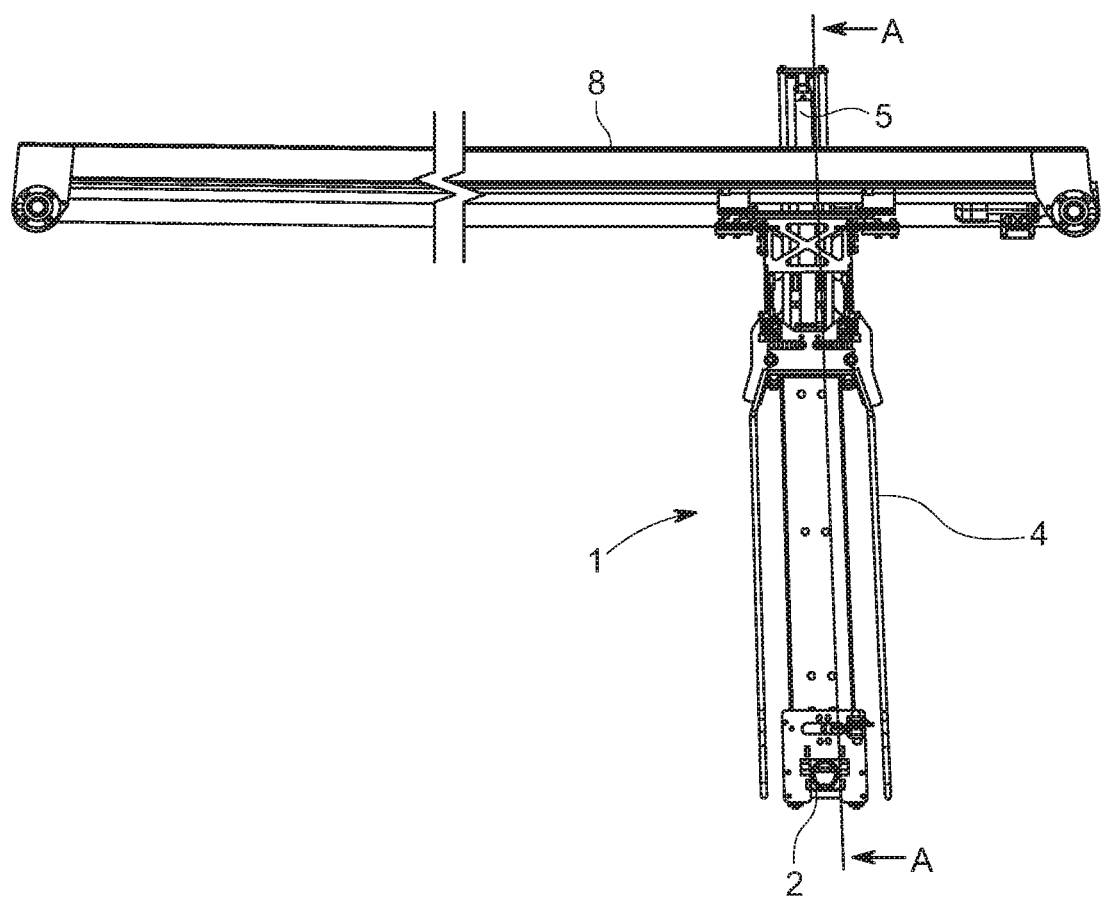
FIG. 6 illustrates a front elevation view of a track and articulated arm thereon with the articulated sprayer in an extended position.
Figure 7:
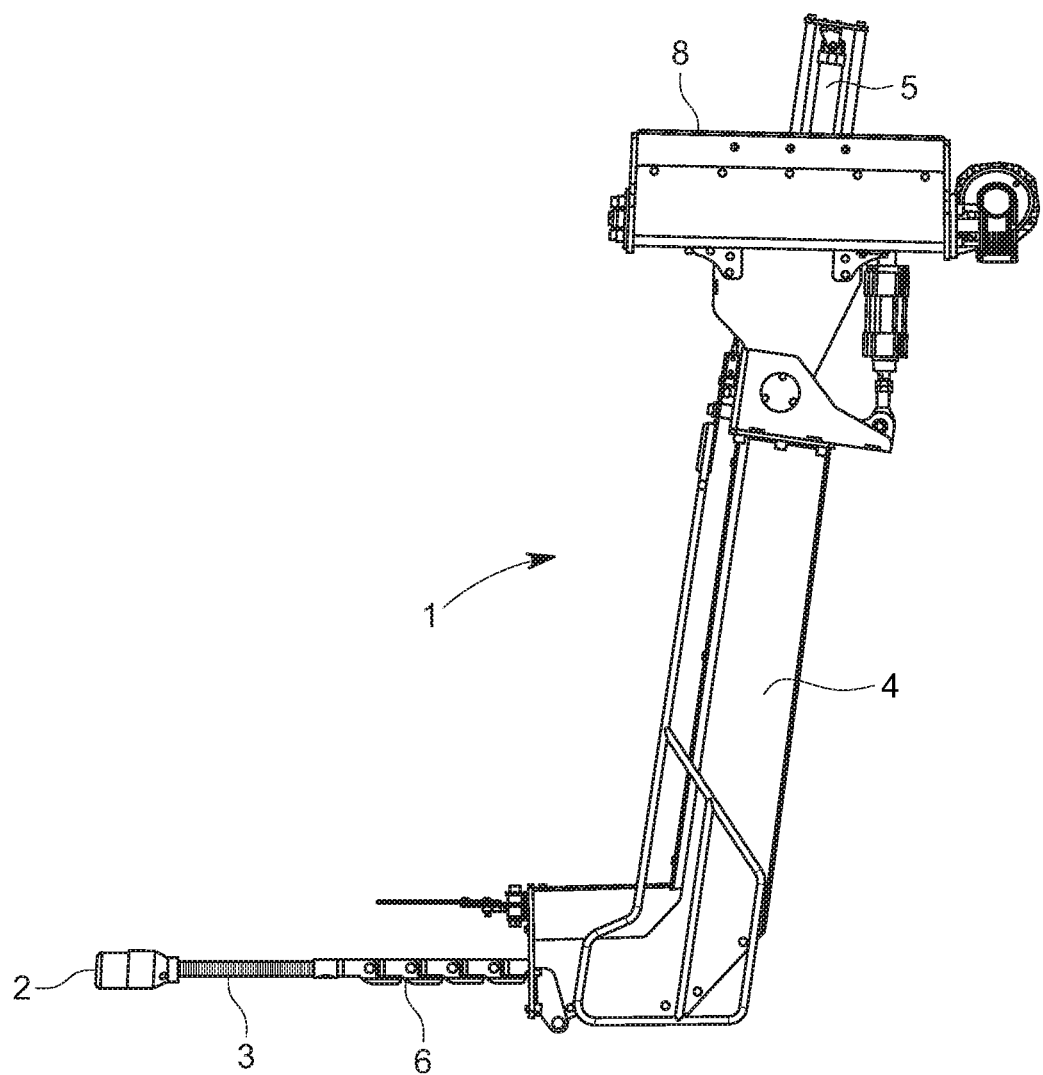
FIG. 7 illustrates a side elevation view of a track and articulated arm thereon with the articulated sprayer in an extended position.
Figure 8:
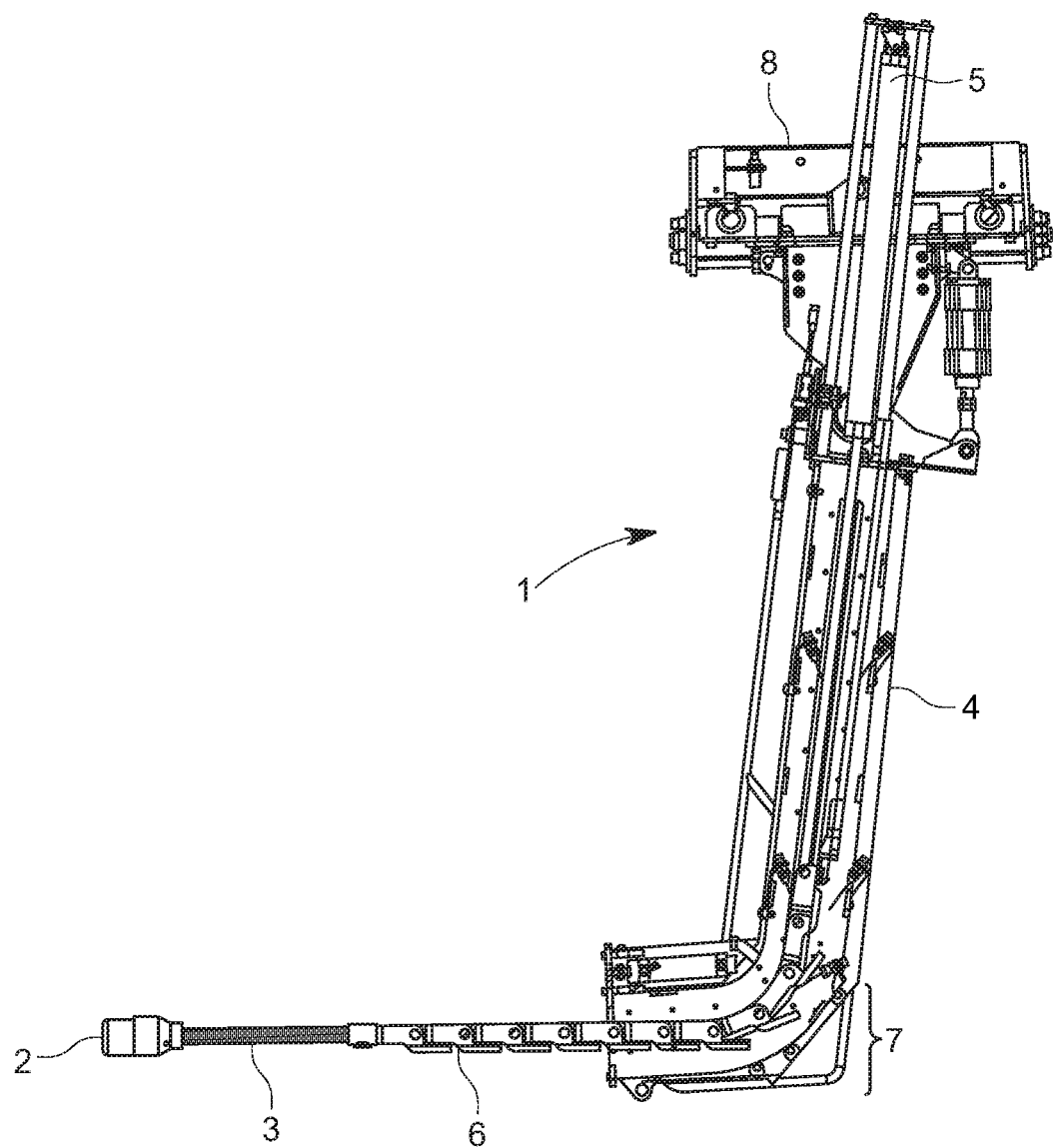
FIG. 8 illustrates a side cross-section elevation view about line A-A in FIG. 6 of a track and articulated arm thereon with the articulated sprayer in an extended position.

As noted above, a teat sprayer for use in dairy applications is described that uses an articulated arm and system to deliver a spray to a teat and move between multiple dairy animals.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The terms 'pen', 'stall', 'bail', 'animal space' and grammatical variations thereof may be used interchangeably to refer to a specific area that an animal is located in during milking.

The term 'animal treatment fluid' and grammatical variations as used herein refers to fluids such as spray liquids. The fluid may be a disinfectant although this should not be seen as limiting and other compounds active or inactive (e.g. water) may be used in the fluid and delivered to the animal.

Apparatus

In a first aspect there is provided a dairy animal teat treatment apparatus, comprising:
  a spray inlet configured for connection to a source of teat treatment fluid;
  a spray nozzle to spray teat fluid therefrom;
  a flow path extending between the spray inlet and the spray nozzle;
  an articulated arm conveying the spray nozzle, movement of the articulated arm driven by an actuator, articulated arm movement being between:
  a retracted position in which the spray nozzle and articulated arm are retracted; and
  an extended position in which at least part of the articulated arm and spray nozzle thereon is extended, moving the spray nozzle to a position configured to be about an animal's udder, the spray nozzle configured to spray treatment fluid from the spray nozzle onto the animal's teats in or about the extended position.

Environment

The above described dairy animal teat treatment apparatus may be used within or on a dairy milking platform. Platforms of this nature are well known and used in the art generally comprising a platform on which a lactating animal such as a dairy cow stands during milking. Such platforms may be termed a 'milking parlour'.

The platform may be a stationary platform. The apparatus may be configured for use alongside a stationary dairy milking platform. Some milking platforms may move the animal while the animal stands still during milking. Rotary platforms are one example of this style of moving milking platform. In this case, the platform may be stationary with the animal and platform on which they stand remaining stationary. The animal enters a bail, stands during milking and other treatments, and then the animal moves away from the pen. As may be appreciated from the above description, the sprayer described has the capability of moving between animals, generally in a lateral direction about a horizontal plane. The system therefore has its own form of movement and, therefore can treat multiple stationary animals independently of animal or platform movement.

In one particular embodiment, the milking platform may be a parallel platform. In this case, the platform comprises a series of bails side by side that the cows are located in during milking. The cows form a line of animals standing side by side during milking. In this style of platform, the track, articulated arm and spray nozzle described may be useful as the articulated arm articulates and therefore takes up less floor space in a milking shed than would be the case if the articulated arm were of a fixed length that did not articulate. Articulation allows the articulated arm comprising the spray nozzle at one end to retract upwards when not in use and extend forwards under the cow when spray is to be applied.

Each animal may be located in a milking bail and the animal and platform thereon elevated.

Articulated Arm

As noted above, the articulated arm and sprayer thereon may be articulated. That is, an articulated arm articulates (or bends or rotates) about a point in the movement path of the articulated arm and spray nozzle.

In a retracted position, the articulated arm may be arranged in a generally vertical or near vertical plane, most or all of the articulated arm being generally aligned together and, when the articulated arm is extended, the articulated arm is urged to articulate about an articulation point along the path of movement.

As the articulated arm extends or retracts, the articulated arm may rotate about an axis or axes along the path of articulated arm movement.

The articulated arm may be located alongside an animal bail when in a retracted position. The articulated arm may be located outside of the general perimeter of the animal bail when in a retracted position.

In an extended position, the articulated arm extends underneath an animal, between the animal hind legs with the spray nozzle directed generally upwards towards the animal udder.

During extension, the articulated arm may move generally parallel to a floor of the animal bail. During extension, the articulated arm may be located around 5 to 200 mm above the animal bail floor.

In one embodiment, articulation occurs via a chain. Individual chain linkages may be joined together to form part or all of the articulated arm and the spray nozzle and any fluid linkages may be coupled to the chain. The chain may define the articulated arm path of motion.

Once past an articulation point, the articulated arm or a part of the articulated arm may comprise a stop to limit movement of the articulated arm beyond that of a generally horizontal plane thereby urging the articulated arm to extend forwards after articulation and retract backwards before articulation about a generally horizontal plane.

When movement of the articulated arm is reversed and the articulated arm is retracted, the articulated arm may articulate in the opposite direction to the extension stroke.

Where a chain is used, the shape of the chain linkages and their interaction together may define the extent of movement possible between linkages. In one embodiment for example, in a retracted position, the chain linkages may be arranged in a generally vertical or near vertical plane. Most or all of the chain linkages in a retracted position may be generally aligned together. When the articulated arm is extended, the chain linkages may be urged to articulate (bend) about a point along the path of movement. This point of articulation may be defined by a guide or track that the chain linkages move along. As articulated arm articulation occurs, the chain linkages may rotate or pivot about an axis or axes defined by the point of articulation. The axis or axes may be located about a joint or joints between the chain linkages.

Once past the articulation point, the chain linkage pivot axes may comprise a stop to limit movement beyond a predetermined point. The predetermined point may be movement beyond that of a generally horizontal plane termed hereafter as 'excess movement'. This stop may be located at a point that ensures that the chain extends forwards under an animal about a generally horizontal plane. When movement of the articulated arm is reversed and the articulated arm is retracted, the above chain linkages may again articulate in the opposite direction to the above description. Expressed an alternate way, the chain as it extends to a horizontal alignment may be weight bearing.

Note that reference to the term 'articulated arm' may encompass the spray nozzle and any fluid conveying lines unless otherwise noted. In typical embodiments, the spray nozzle may extend forward of the articulated arm ending and may lead movement under an animal during extension of the articulated arm.

In one embodiment, the degree of articulation of the articulated arm between retracted and extended configurations may be approximately 70, or 75, or 80, or 85, or 90, or 95, or 100, or 105, or 110, or 115, or 120, or 125, or 130, or 135, or 140 degrees from a horizontal plane. For example, the degree of articulation may range from 70-140 degrees or 80-140 degrees from a horizontal plane.

Housing

The apparatus may further comprise a housing. The housing may receive at least part of the articulated arm and related parts when the articulated arm is retracted. The articulated arm may extend from the housing during extension to an extended position.

The housing may at least partly enclose the articulated arm when the articulated arm is in a retracted position. The articulated arm may be fully enclosed by the housing. Enclosing, partial or full, may occur when the articulated arm is in a retracted position.

The housing may comprise a guide on or alongside or through which the articulated arm moves and which urges the articulated arm to articulate as the articulated arm extends or retracts.

The housing may be located alongside an animal bail. The housing may be located outside of the general perimeter of the animal bail.

The articulated arm housing may be located in a generally upright or vertical plane position. As may be appreciated from the above degree of articulation, the articulated arm/housing may be somewhat angled relative to a vertical plane, for example angled relative to a purely vertical plane by about 5, or 10, or 15, or 20 or 25 or 30 degrees. This may be useful to create some clearance between the base of the articulated arm housing and the point at which the housing links to a track on which the articulated arm is connected and/or which the arm moves on. Tracks are described further below.

A slight angle relative to a vertical plane results in a toe end of the articulated arm housing somewhat closer to an animal than would be the case if the articulated arm housing were in a true vertical plane. Movement somewhat closer to the cow may lessen the length of the articulated arm and spray nozzle thereon required, and therefore reduce capital cost and increase speed of extension and retraction through a smaller path of travel being needed.

Actuator

Movement between the extended and retracted positions may be driven or governed by one or more actuators. In one embodiment, a linear actuator may be used to urge movement. The linear actuator may be the only actuator urging movement. The one or more actuators may be pneumatic powered, although other urging systems may be used e.g. hydraulic or electrical systems. The one or more actuators may, in one embodiment, be located on or about the housing so as to be partly enclosed by the housing or at least is located about the general articulated arm/housing shape and form when the articulated arm is in a retracted position.

Spray Nozzle

The spray nozzle may comprise at least one nozzle from which spray fluid is ejected. Multiple spray nozzles may be used about the spray nozzle and reference to singular does not exclude plural spray nozzles herein.

The spray nozzle may be configured to spray a fan pattern of fluid therefrom. The fan pattern may be angled relative to a vertical plane. In one embodiment, as an articulated arm extends or retracts, the fan pattern is angled ahead of the direction of movement. For example, during extension, the spray nozzle fan is angled towards the animal and away from the articulated arm housing and, on retraction movement, the spray nozzle fan is angled towards the housing and away from the animal. This reversal of spray nozzle fan direction may be useful to ensure even coverage of all sides to the animal udder/teats.

Resilient Connection

The region between a chain or articulated arm ending and the spray nozzle may comprise a resilient connection. This region may be referred to hereafter as the nozzle carrier region. In this embodiment, the term 'resilient' refers to the nozzle carrier being configured to absorb knocks bumps or blows and return to an original position. As is known in the art, and described in the applicant's patent application published as WO2011/078702, some resilience may be important to address knocks or blows to the spray nozzle typically from an animals legs or hooves but, also from deflection against the bail or other structures surrounding the milking platform. Resilience and the ability to return the spray nozzle back to a desired position (position memory) may be useful for device longevity. In this apparatus, the nozzle carrier may be a spring. The spring may be a coiled spring however, other spring forms and configurations may be used. Other resilient materials or forms may be used as well such as through use of materials or forms e.g. rods or bars capable of at least some degree of elastic deformation.

Movement Between Animals

The apparatus may be conveyed on a track, the track configured to convey the articulated arm and articulated arm housing and in doing so, move the spray nozzle and other apparatus parts as well. Movement along the track moves the articulated arm between animal bails on an animal dairy platform.

The track may be a generally elongated structure, the track shape complementary to the shape of an adjoining milking platform. In a parallel platform embodiment for example, the track may have a linear and elongated shape. The track may be located behind animal bails on a dairy platform to allow the apparatus to move and align with an animal bail. In one embodiment the track may be aligned so that extension of the articulated arm and spray nozzle occurs in a direct line between the animal legs when an animal is positioned in a bail.

The track may allow the apparatus to be moved from one animal to another animal. Movement may be in sequence from one adjacent animal to the next. Movement may alternatively be random, for example to move the apparatus to an animal that has finished milking and, once teat spraying is complete, move then to another animal located somewhere else along the track length and not necessarily the immediate adjacent animal.

A motor or motors may drive movement of the apparatus on the rail.

The position of the apparatus on the track may be governed by a controller that receives a sensor signal, the sensor signal being a function of location on the track or the apparatus. Location data may for example be based around a datum point on the track and a distance traversed from this datum point by the apparatus as it moves along the track. Apparatus position may at least in part, also be governed by at least one optical sensor positioned about an animal bail and directed generally downwards to sense the presence of an animal in the animal bail. In one embodiment, the optical sensor may be positioned generally above and generally behind an animal bail.

Sensing and Actuation

In a second aspect, there is provided a dairy animal teat treatment apparatus, comprising:
- a spray inlet configured for connection to a source of teat treatment fluid;
- a spray nozzle to spray teat fluid therefrom;
- a flow path extending between the spray inlet and the spray nozzle;
- an animal milking platform comprising at least one animal bail;
- at least one optical animal sensor positioned generally above and behind an animal bail and directed generally downwards configured to sense the presence of an animal in the animal bail; and
- a controller configured to actuate spraying of the animal's teats from spray nozzle extension and retraction in response to a signal received from the optical animal sensor detecting the presence of an animal in the animal bail.

Sensors

Actuation of the apparatus to extend and retract the spray nozzle may be driven by a sensor and control system. The sensor or sensors may as noted, be located generally above and behind the animal to be treated. The sensor may be an optical beam of light that may be emitted from a point generally above and generally behind the animal. When the beam of light length is broken or reaches a known value, apparatus spray actuation occurs. The beam of light length may be broken or changed in length by the rear of the animal. In one example, the beam length may form a series of waves as the apparatus moves along a track, the wave shape corresponding to beam length extending and shortening as the sensor passes the rear of different animals. This wave shape may provide apparatus positional data to a controller.

In one embodiment, the optical beam of light may be a laser beam although other light sources and frequencies may be used includes into the non-optical infrared and ultra violet spectrums. The term 'optical' is used for ease of reference referring to visual light frequencies however, as noted above, frequencies beyond an optical range may also be used.

Multiple sensors may be used. For example, in one embodiment two or more light beams may be emitted from points generally above and generally behind an animal bail. These sensors may be mounted side by side, generally about each side of an apparatus or spray nozzle and directed towards the animal bail. The spacing between the sensors may be sufficient to have the sensor beams unbroken by an animal rear i.e. the beams may, if positioned ideally, extend to either side of the animal to be treated.

The point at which the apparatus is actuated to spray fluid may be when both of the side by side beams are at a longer beam length indicating the apparatus or spray nozzle is at a location centred about an animal udder. The controller may be pre-warned of this mid-position by a first sensor beam being shortened (commensurate with the beam being broken by the animal rear) and then lengthening again once at a point immediately past the animal rear.

Animal

Reference is made above to the apparatus being a dairy animal teat treatment apparatus. The animal may be a lactating cow however, as should be appreciated, the apparatus need not be limited to use for cows alone and may also be used to treat other animals including lactating sheep and lactating goats. Reference to cows herein should not be seen as limiting.

Methods of Use

In a third aspect there is provided a method of treating an animal via a dairy animal teat treatment apparatus, comprising the steps of:
- providing a dairy animal teat treatment apparatus substantially as described above;

providing an animal bail and an animal therein;

moving the articulated arm of the apparatus from the retracted position in which the spray nozzle and articulated arm are retracted to the extended position in which at least part of the articulated arm and spray nozzle thereon is extended, moving the spray nozzle to a position about an animal's udder, the spray nozzle spraying treatment fluid from the spray nozzle onto the animal's teats in or about the extended position.

In the above method, the apparatus may be conveyed on a track, and the method of treatment repeated for one or more further animals. The further animals may be in parallel bails and the apparatus moved to further bail to treat a further animal. Movement may be in response to a signal received from a milking apparatus to indicate completion of milking and removal of cups, the teats then being ready for treatment. Movement as noted above in this method may be sequential, one bail beside the other or at random, based on received bail signals for animal treatment being required.

In a fourth aspect, there is provided a method of detecting and causing spray actuation of a dairy animal teat treatment apparatus, comprising the steps of:

providing a dairy animal teat treatment apparatus substantially as described above including an animal milking platform comprising at least one animal bail;

locating an animal into the animal bail and movement of the animal causing the at least one optical animal sensor positioned generally above and behind the animal bail and directed generally downwards to sense the presence of the animal as the animal enters the animal bail; and the controller then actuating spraying of the animal's teats from spray nozzle extension and retraction in response to the signal received from the optical animal sensor detecting the presence of the animal in the animal bail.

Working Example

To further illustrate the above features of the spray system, reference is made to FIGS. 1-4 that illustrate the track and articulated arm with the sprayer in a retracted position; FIGS. 5-8 that show the sprayer in an extended position; and FIGS. 9-10 show detailed aspects of one embodiment of an articulated arm.

As shown in these Figures, the apparatus, generally indicated by arrow 1, comprises a spray nozzle 2, nozzle carrier 3, housing 4, actuator 5 and articulated arm 6. FIGS. 1-4 as noted show the spray nozzle 2 in a retracted position, the articulated arm 6 located inside the housing 4. The apparatus 1 is mounted to a track 8. FIGS. 5-8 show the extended position of the apparatus 1 with the spray nozzle 2 urged forwards from the housing 4 via movement of the articulated arm 6, articulated arm movement urged by the actuator 5 about an articulation point generally indicated by arrow 7 best seen in FIG. 8.

Figure 9:
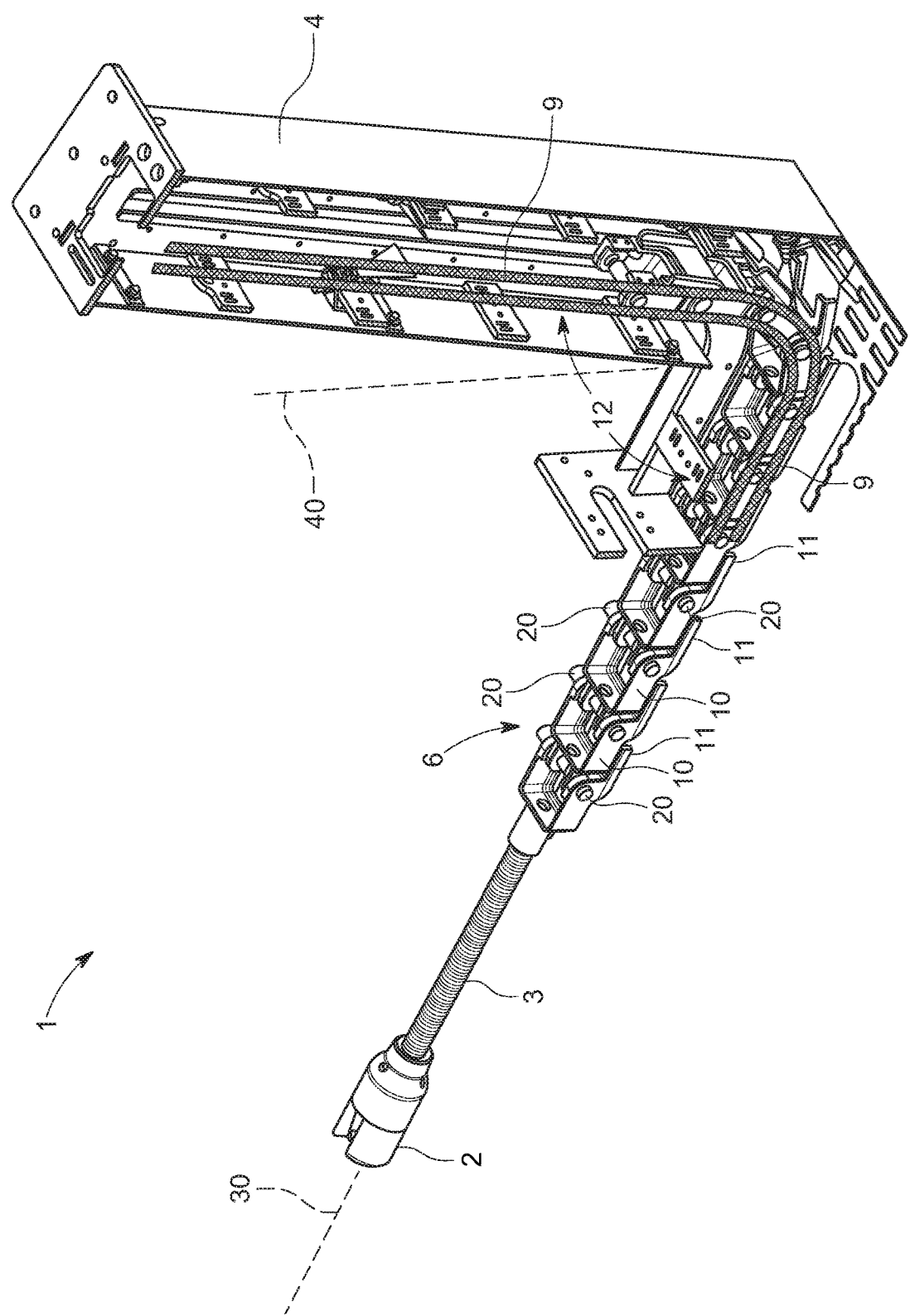
FIG. 9 illustrates a detail rear perspective cross-section view of the articulated arm with the articulated sprayer in an extended position.
Figure 10:
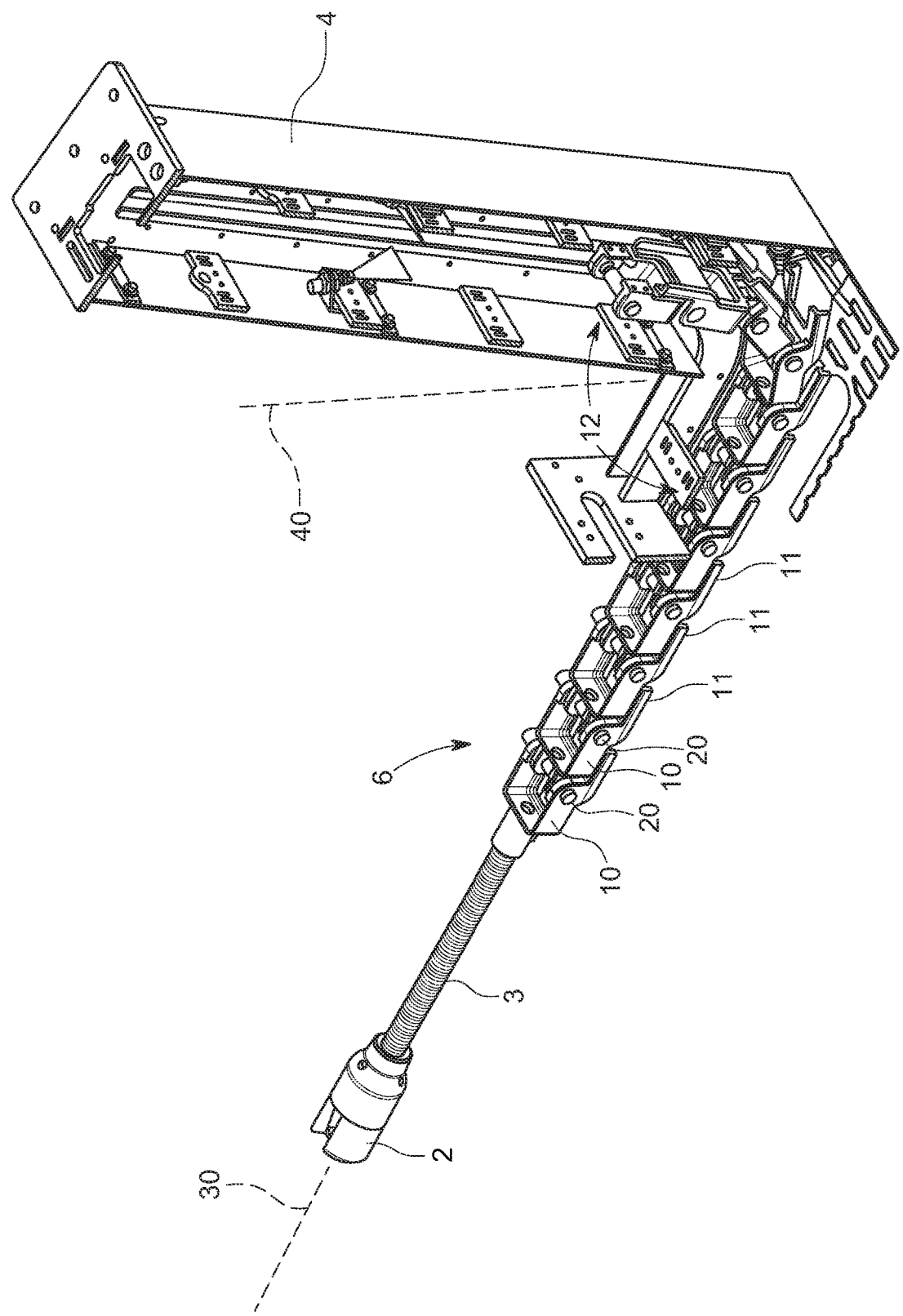
FIG. 10 illustrates an alternate detail rear perspective cross-section view of the articulated arm with the articulated sprayer in an extended position.

Detail views shown in FIG. 9 and FIG. 10 illustrate a cut away view of the apparatus 1 with the housing 4 on one side removed. FIG. 9 shows a guide 9 that is used to direct movement of the articulated arm 6 about the articulation point 7. The articulated arm 6 as shown in these Figures comprises a series of chain linkages 10. The chain linkages 10 comprise rotation axes or hinges 20 and stops 11 that prevent excess movement beyond a horizontal plane indicated by dashed line 30. The articulated arm 6 articulates about an articulation angle 12 shown in the Figures. This may be somewhat offset to a purely vertical plane indicated by dashed line 40. The articulation angle may be from 70-140 degrees, in this embodiment around 95-125 degrees.

Figure 12:
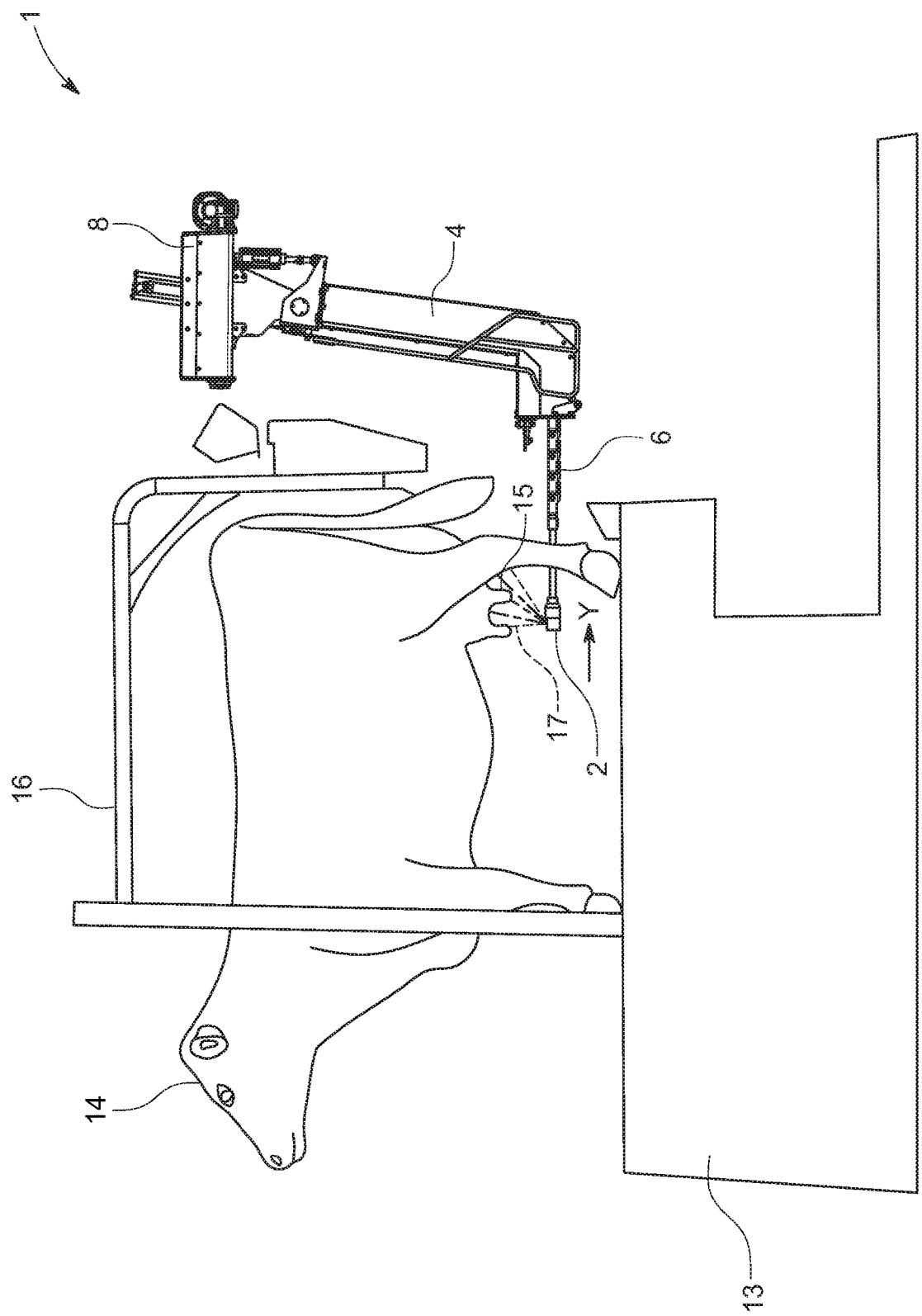
FIG. 12 illustrates a side elevation view of the system, in this view with the sprayer retracting from the articulated arm and in a position of applying spray to the teats of a cow.
Figure 13:
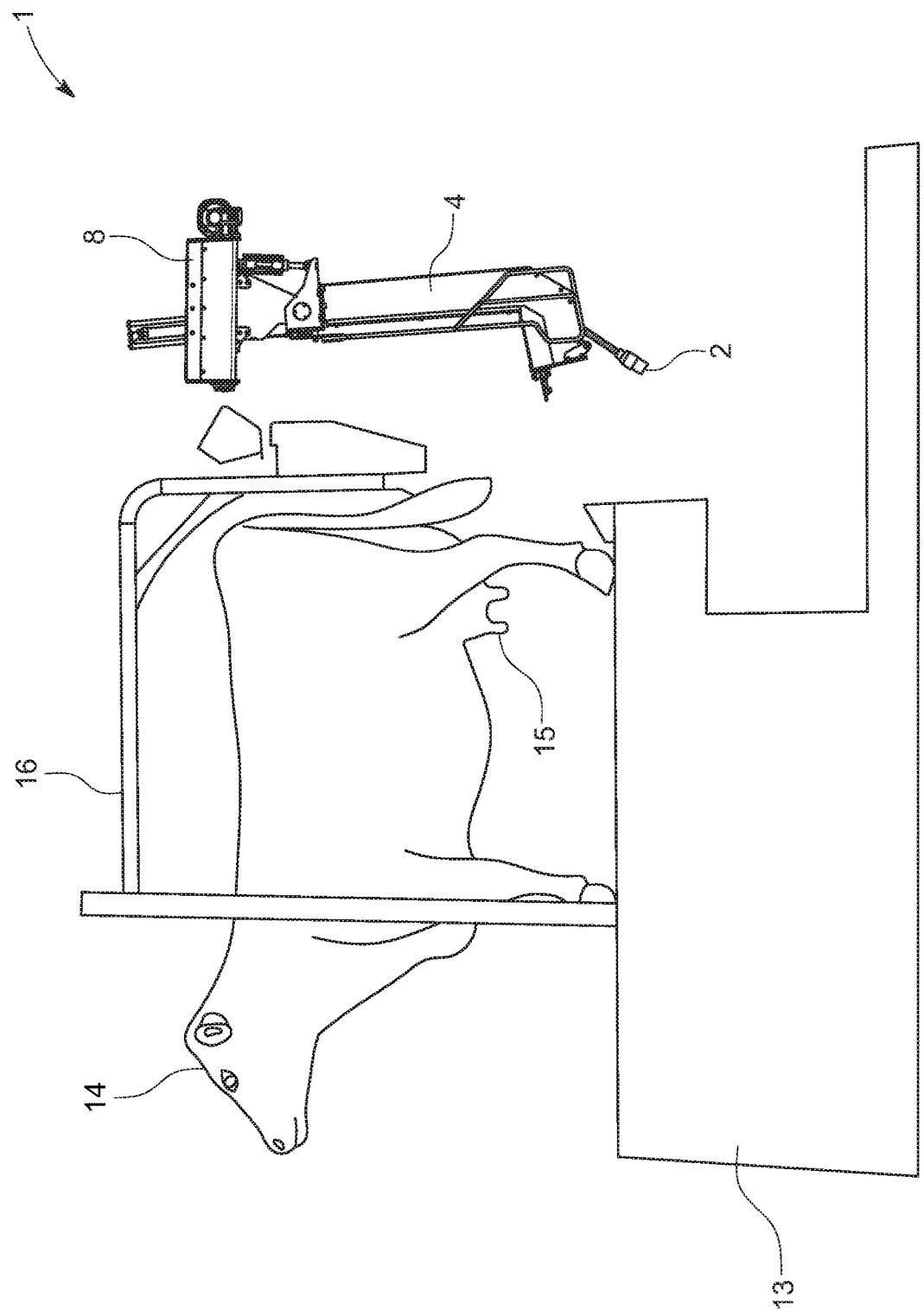
FIG. 13 illustrates a side elevation view of the system, in this view with the sprayer fully retracted into the articulated arm.
Figure 14:
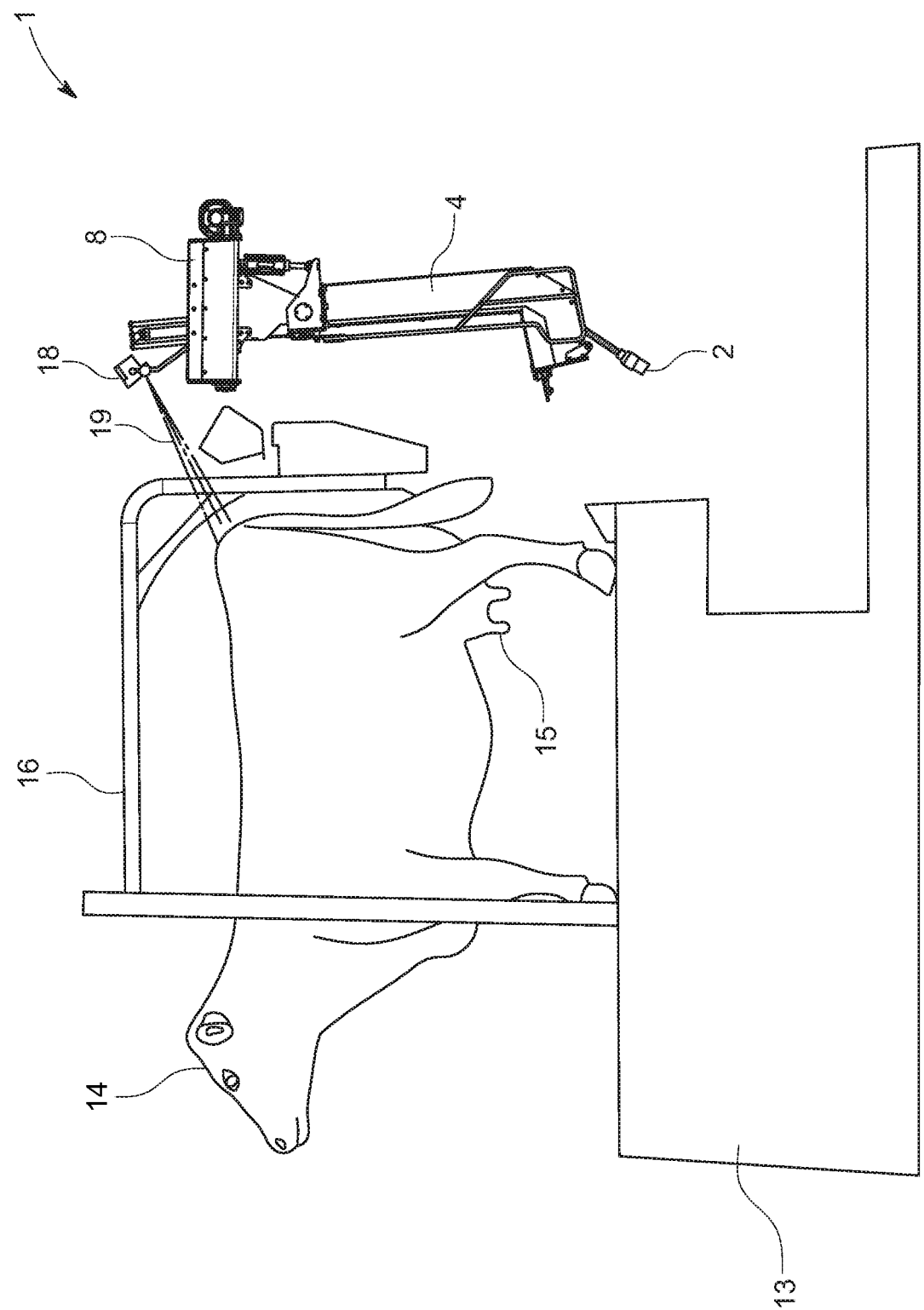
FIG. 14 illustrates a side elevation view of the system, in this view with the sprayer fully retracted into the articulated arm and the articulated arm moving on the rail with the sensor operating to determine cow position.

FIGS. 11-16 illustrate the system as a whole and movement of the sprayer between cows. FIG. 14 illustrates one embodiment of sensor location and operation. FIG. 16 illustrates an alternate embodiment of sensor arrangement.

Figure 11:
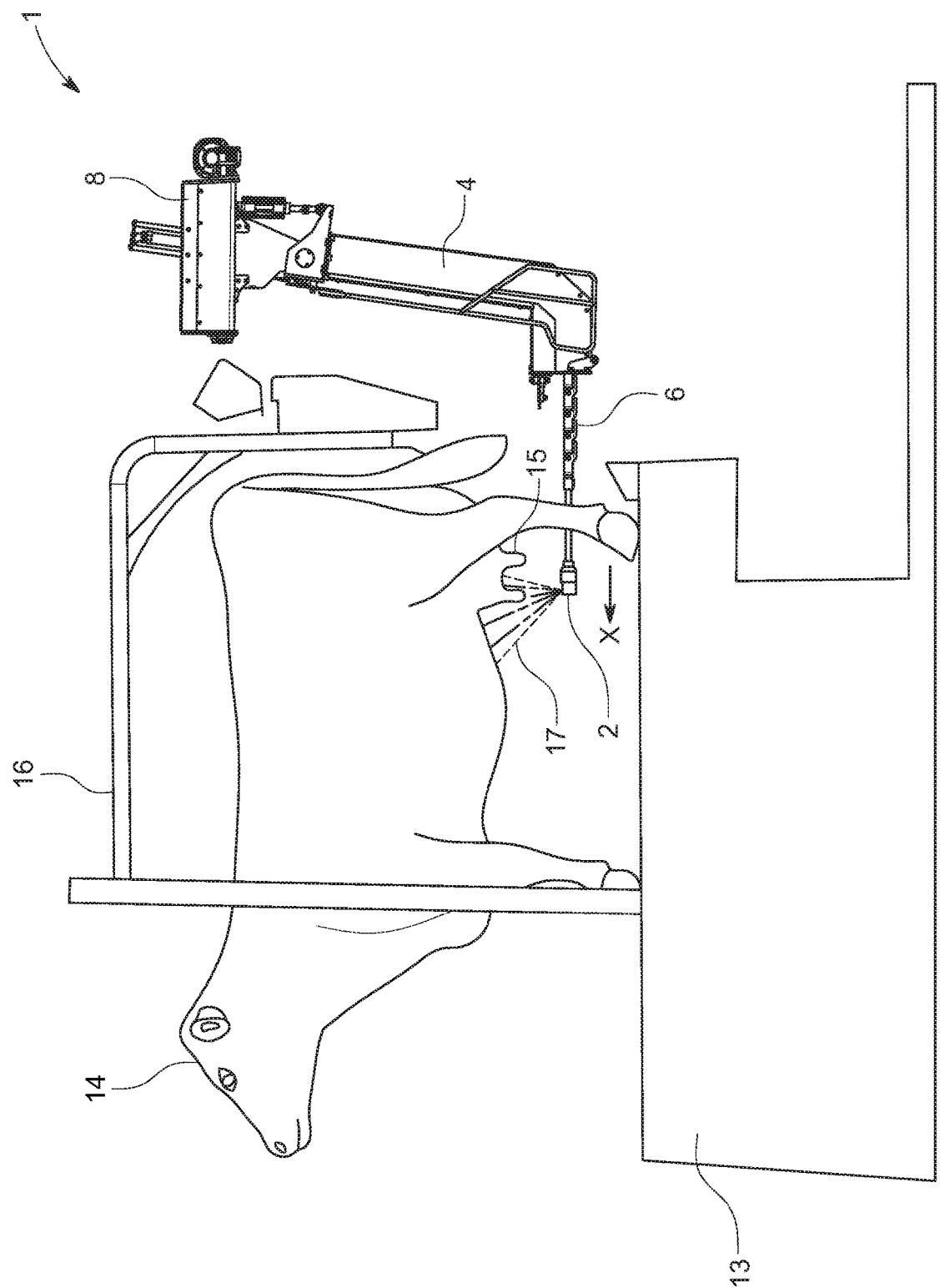
FIG. 11 illustrates a side elevation view of the system, in this view with the sprayer extending from the articulated arm and in a position of applying spray to the teats of a cow.
Figure 15:
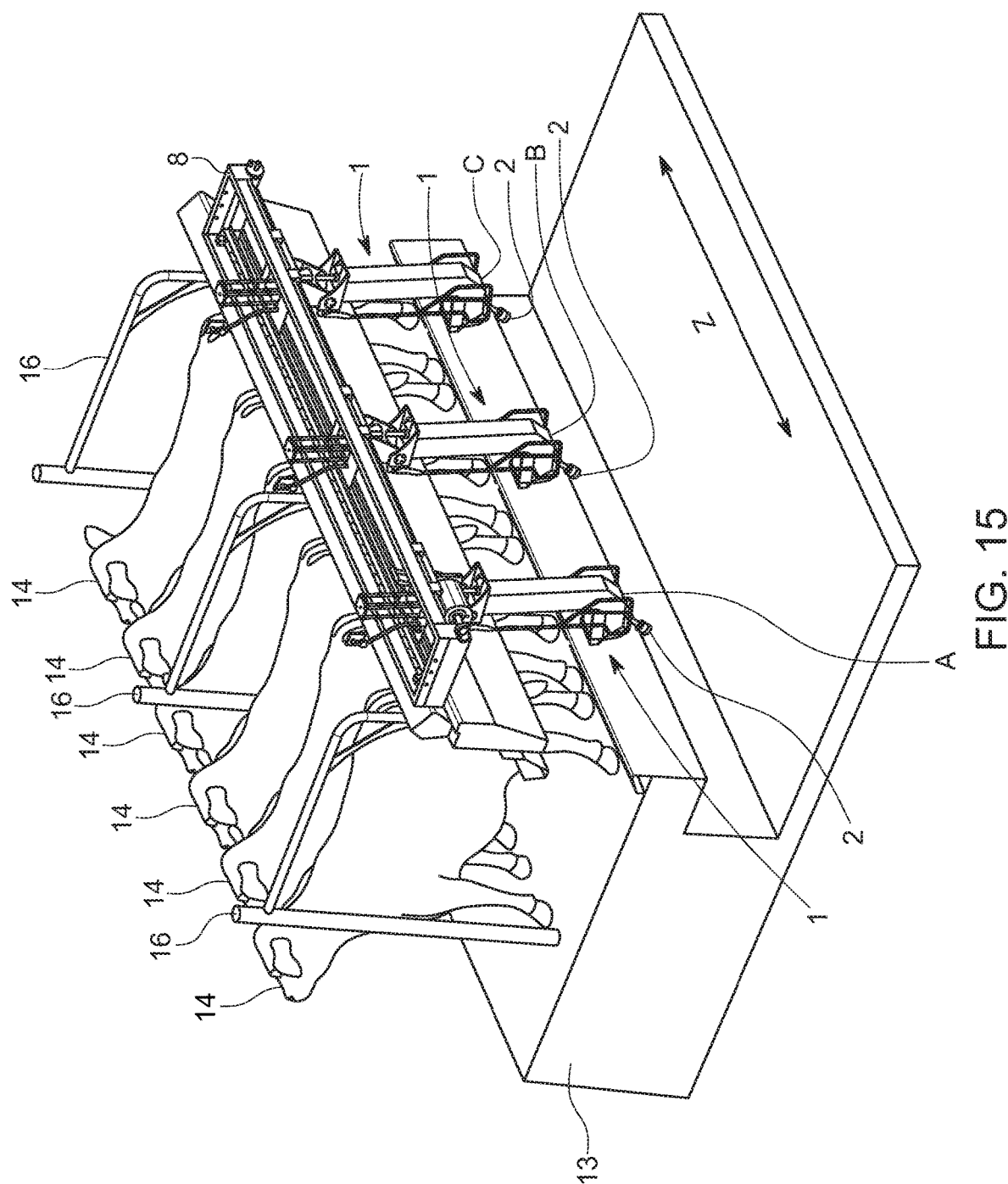
FIG. 15 illustrates a rear perspective view of the system with the sprayer fully retracted and the articulated arm illustrated at differing points along the track relative to different cows in the parlour.

In more detail, FIG. 11 shows the cow 14 standing on a platform 13 in a bail 16. The apparatus 1 spray nozzle 2 is extending forwards in direction X from the housing 4 under the cow 14 udder 15. The spray 17 pattern from the spray nozzle 2 is tilted slightly forwards relative to a vertical plane in the direction of movement X. FIG. 12 shows the opposite where apparatus 1 spray nozzle 2 is retracting backwards in direction Y from the housing 4 under the cow 14 udder 15. The spray 17 pattern from the spray nozzle 2 is tilted slightly backwards relative to a vertical plane in the direction of movement Y. FIG. 13 shows the spray nozzle 2 fully retracted into the housing 4. FIG. 14 shows the apparatus 1 moving on the track 8, an optical sensor or sensors 18 located generally above and generally behind the cow 14 directing a laser beam 19 towards the cow 14. When the laser beam 19 path length is reduced e.g. from a cow 14 rear, the sensor knows that an animal is present and further teat spraying may commence. FIG. 15 illustrates a parallel platform arrangement with cows standing adjacent each other and the track 8 located behind the cows 14, the apparatus 1 moving laterally (arrow Z) behind the cows 14. FIG. 15 shows by way of example three locations A, B, C of the apparatus 1 along the track 8, each position corresponding to a cow 14 to be treated. FIG. 16 illustrates an alternative sensing embodiment. In this embodiment two sensors 18 may be used generally above and generally behind the cow 14. The two sensors emitting beams 19, the beams spaced so as to extend about the rear of a cow 14 when in position for treatment. Optionally, lower sensors 20 may also be used with beams 21 extending towards the cow 14 legs. These lower sensors 20 may be used to assist the upper sensors 18 to determine the cow 14 leg alignment and spacing to ensure the spray nozzle 2 extends between the cow 14 legs. The lower sensors 20 if used, may be located generally behind the cow 14 with a beam 21 extending generally forwards in a horizontal plane. Use of a second lower set of sensors 20 (or single lower sensor (not shown) is not envisaged as being essential for operation of the apparatus but may be useful where very high accuracy positioning and dosing is important.

Advantages of the above apparatus may comprise one or more of the following:

Lower cost through reduced numbers of treatment apparatus and/or lower labour costs and expenses;

Greater accuracy/efficiency through automation and speed of treatment;

Addressing issues associated with the inconvenience/ space constraints in dairy platform configurations where large bulky foot print devices are either unable to be installed or which create an impediment to access;

The apparatus described minimises the number of sensors required and also positions these sensors away from the animal/bail. This may minimise problems with dirt etc. affecting sensors and sensor performance yet still achieve the desired accuracy.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

Aspects of the sprayer with an articulated arm and sensor system have been described by way of example only and it should be appreciated that modifications and additions may be made thereto without departing from the scope of the claims herein.

The invention claimed is:

1. A dairy animal teat treatment apparatus, including:
a spray nozzle to spray teat fluid therefrom; and
an articulated arm conveying the spray nozzle, movement of the articulated arm driven by an actuator, articulated arm movement being between:
a retracted position in which the spray nozzle and articulated arm are retracted; and
an extended position in which at least part of the articulated arm and spray nozzle thereon is extended, moving the spray nozzle to a position configured to be about an animal's udder, the spray nozzle configured to spray treatment fluid from the spray nozzle onto the animal's teats in or about the extended position;
wherein as the articulated arm extends or retracts, the articulated arm rotates about an axis or axes along the path of articulated arm movement.

2. The apparatus as claimed in claim 1 wherein the apparatus is configured for use alongside a stationary dairy milking platform.

3. The apparatus as claimed in claim 1 wherein the milking platform is a parallel dairy milking platform.

4. The apparatus as claimed in claim 1 wherein the articulated arm articulates about a point in the movement path of the articulated arm and spray nozzle.

5. The apparatus as claimed in claim 1 wherein, in a retracted position, the articulated arm is arranged in a generally vertical or near vertical plane, most or all of the articulated arm being generally aligned together and, when the articulated arm is extended, the articulated arm is urged to articulate about an articulation point along the path of movement.

6. The apparatus as claimed in claim 1 wherein the articulated arm comprises a chain whereby individual chain linkages are joined together to form the articulated arm and the spray nozzle and any fluid linkages are coupled to the chain.

7. The apparatus as claimed in claim 1 wherein, once past an articulation point, the articulated arm or a part of the articulated arm comprises a stop to limit movement of the articulated arm beyond that of a generally horizontal plane thereby urging the articulated arm to extend forwards after articulation and retract backwards before articulation about a generally horizontal plane.

8. The apparatus as claimed in claim 1 wherein, when movement of the articulated arm is reversed and the articulated arm is retracted, the articulated arm articulates in the opposite direction to the extension stroke.

9. The apparatus as claimed in claim 1 wherein the degree of articulation of the articulated arm between retracted and extended configurations ranges from 70-140 degrees from a horizontal plane.

10. The apparatus as claimed in claim 1 wherein the housing at least partly encloses the articulated arm when the articulated arm is in a retracted position.

11. The apparatus as claimed in claim 1 wherein the spray nozzle comprises at least one nozzle from which spray fluid is ejected wherein the nozzle is configured to spray a fan pattern of fluid therefrom and wherein the fan pattern is angled relative to a vertical plane and wherein, as the articulated arm extends or retracts, the fan pattern is angled ahead of the direction of movement.

12. The apparatus as claimed in claim 1 wherein a nozzle carrier region between an ending of the articulated arm and the spray nozzle comprises a resilient connection.

13. The apparatus as claimed in claim 1 wherein the apparatus is conveyed on a track, the track configured to convey the articulated arm and articulated arm housing between animal bails.

14. The apparatus as claimed in claim 13 wherein the position of the apparatus on the track is governed by a controller that receives a sensor signal, the sensor signal being a function of location on the track or the apparatus, location being based around a datum point on the track and a distance traversed from this datum point by the apparatus as it moves along the track.

15. The apparatus as claimed in claim 14 wherein the apparatus position at least in part is also governed by at least one optical sensor positioned about an animal bail and directed generally downwards to sense the presence of an animal in the animal bail.

16. A dairy animal teat treatment apparatus, including:
a spray nozzle to spray teat fluid therefrom; and
an articulated arm conveying the spray nozzle, movement of the articulated arm driven by an actuator, articulated arm movement being between:
a retracted position in which the spray nozzle and articulated arm are retracted; and
an extended position in which at least part of the articulated arm and spray nozzle thereon is extended, moving the spray nozzle to a position configured to be about an animal's udder, the spray nozzle configured to spray treatment fluid from the spray nozzle onto the animal's teats in or about the extended position;
wherein the articulated arm comprises a chain whereby individual chain linkages are joined together to form the articulated arm and the spray nozzle and any fluid linkages are coupled to the chain.

17. A dairy animal teat treatment apparatus, including:
a spray nozzle to spray teat fluid therefrom; and
an articulated arm conveying the spray nozzle, movement of the articulated arm driven by an actuator, articulated arm movement being between:
a retracted position in which the spray nozzle and articulated arm are retracted; and
an extended position in which at least part of the articulated arm and spray nozzle thereon is extended, moving the spray nozzle to a position configured to be about an animal's udder, the spray nozzle configured to spray treatment fluid from the spray nozzle onto the animal's teats in or about the extended position;
wherein, when movement of the articulated arm is reversed and the articulated arm is retracted, the articulated arm articulates in the opposite direction to the extension stroke.

18. A dairy animal teat treatment apparatus, including:
a spray nozzle to spray teat fluid therefrom; and
an articulated arm conveying the spray nozzle, movement of the articulated arm driven by an actuator, articulated arm movement being between:
a retracted position in which the spray nozzle and articulated arm are retracted; and an extended position in which at least part of the articulated arm and spray nozzle thereon is extended, moving the spray nozzle to a position configured to be about an animal's udder, the spray nozzle configured to spray treatment fluid from the spray nozzle onto the animal's teats in or about the extended position;

wherein the apparatus is conveyed on a track, the track configured to convey the articulated arm and articulated arm housing between animal bails.

19. The apparatus as claimed in claim 18 wherein the position of the apparatus on the track is governed by a controller that receives a sensor signal, the sensor signal being a function of location on the track or the apparatus, location being based around a datum point on the track and a distance traversed from this datum point by the apparatus as it moves along the track.

20. The apparatus as claimed in claim 19 wherein the apparatus position at least in part is also governed by at least one optical sensor positioned about an animal bail and directed generally downwards to sense the presence of an animal in the animal bail.

\* \* \* \* \*